(No Model.)
C. V. GREENAMYER.
ELECTRIC POWER BRAKE.
No. 458,249. Patented Aug. 25, 1891.
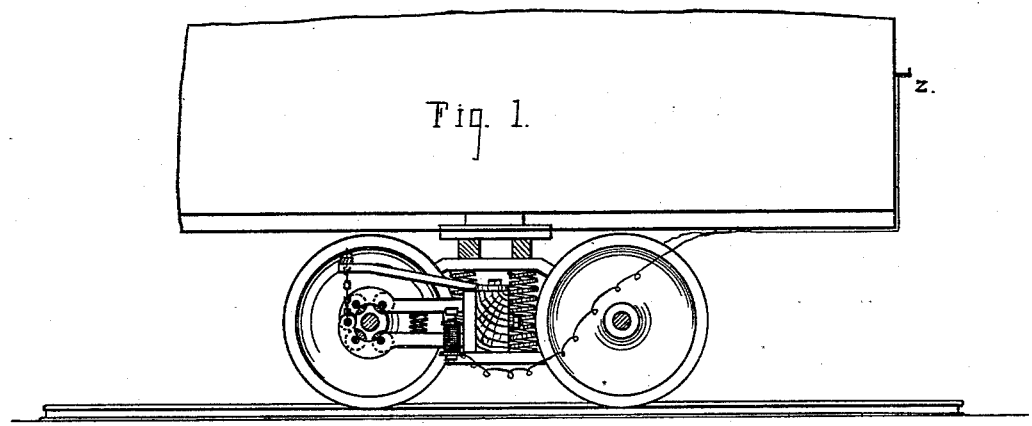
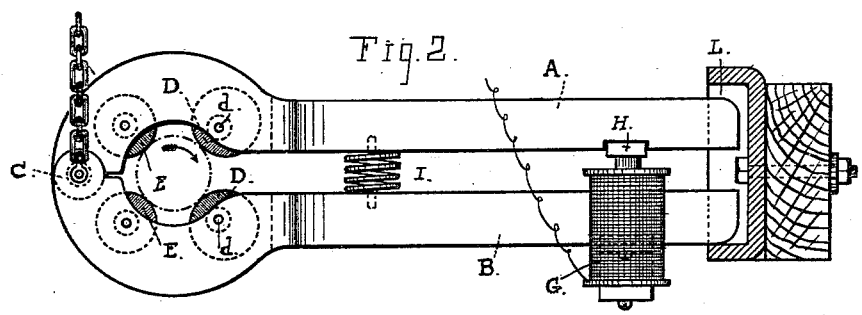
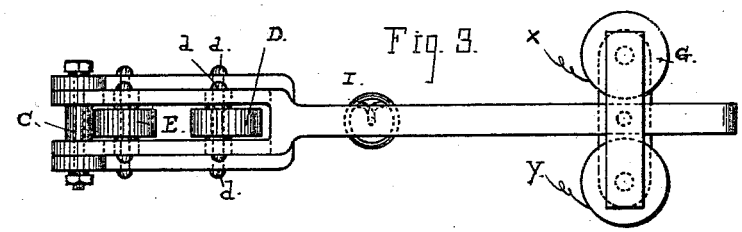
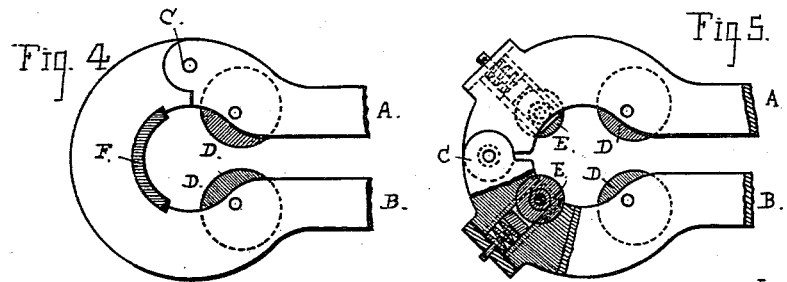
Witnesses:
Wm Mayer
A M Charlot
Inventor:
Clarence V. Greenamyer
By Smith & Osborn
Atty's

UNITED STATES PATENT OFFICE.

CLARENCE V. GREENAMYER, OF SAN FRANCISCO, CALIFORNIA, ASSIGNOR TO THE VERNER WRENCH CAR MOVER AND POWER MANUFACTURING COMPANY, OF CALIFORNIA.

ELECTRIC POWER-BRAKE.

SPECIFICATION forming part of Letters Patent No. 458,249, dated August 25, 1891.

Application filed December 2, 1890. Serial No. 373,388. (No model.)

*To all whom it may concern:*

Be it known that I, CLARENCE V. GREENA-MYER, a citizen of the United States, residing in the city and county of San Francisco, State of California, have invented certain new and useful Improvements in Power-Brakes for Shafts and Axles, of which the following is a specification.

My invention has for its object the production of a powerful brake or gripping device for stopping a revolving shaft or axle, and particularly for use on railway-cars as an "emergency brake," where a sudden stop is called for. It is applied directly to the axles of the truck, and it is of such character that it seizes and grips the axles with a force that is increased by the rotative movement of the axle itself. It is well adapted, also, to other uses and situations where the movement of a revolving shaft or other part in machinery is to be controlled.

The invention consists in certain novel parts and combination of parts comprising arms or levers united at adjacent ends, where they are bent or suitably shaped to surround or embrace the shaft or axle, and gripping wheels or rollers mounted on eccentric pivots in position to be brought and pressed against the axle by the act of closing or drawing together the outer ends of the arms or levers. The degree of holding power is governed by the length of the levers; but the gripping force is applied by the eccentrically-pivoted wheels. In connection with these parts friction-wheels are sometimes set in the jaw or part surrounding the axle to afford a rolling contact instead of a rubbing contact of the gripping-surface with the axle. The arms or levers stand normally apart on the same side of the axle and are drawn together to set and hold the brake. This can be done either directly by mechanical means or by application of steam or compressed air or electricity through the medium of suitable mechanism.
Electricity, by reason of its general simplicity of application and its rapidity of action, offers many advantages, and for most purposes I believe it is the best agent for working this brake. To operate the brake by this agent I mount an electro-magnet in open circuit upon one arm or lever and an armature on the other arm or lever in position over the poles of the magnet, so that the two arms are drawn together when the circuit is closed through the magnet; but I do not limit the invention to such means or to any particular means of drawing together the arms or levers. They can be worked mechanically also by a brake-shaft similar to the ordinary mechanism used on cars to work a shoe-brake by hand.

The accompanying drawings, forming part of this specification, shows the brake arranged to be worked by electricity and its construction and application to the axle of a railway-car.

Figure 1 represents in side elevation and partly in section the truck and body of a box-car at one end with my invention applied to one of the axles. Fig. 2 is a side view of the brake on a larger scale. Fig. 3 is a top view of Fig. 2. Fig. 4 is a modification having a friction-shoe in place of rollers. Fig. 5 shows a construction in which the friction-wheels are mounted in yielding bearings.

A and B are two arms or levers united at adjacent ends by a loose joint or hinge C and bent or shaped at these ends to form a jaw or part to pass around or embrace the rod or shaft or axle, to which the brake force is to be applied. The curved ends are slotted or forked, as seen in Fig. 3, and between them are mounted gripping rollers or wheels D D on axles *d*, set eccentrically in the wheels. These axles are set in such position that the rim of the wheel opposite the shortest radius extends beyond the inner face of the jaw part and will come in contact with the shaft or axle when the two arms are brought together. At the time of contact the pressure of the eccentric against the shaft or axle when sufficient to produce rotation causes the eccentric to turn and the part of longest radius is brought around between the shaft and the center on which the eccentric is mounted. This action draws the back or inner face of the brake tightly against the axle with a force of pressure that increases until the eccentric jams or can turn no farther. The face of the jaw that bears against the shaft may have a removable shoe or wearing-surface, as shown in Fig. 4, to be renewed when worn down. Instead of this shoe I sometimes place friction-rollers E in the curved jaw, as shown in Figs. 1 and 2, so that a rolling contact instead of a rubbing-contact with the axle is obtained. In some cases, also, I mount these friction-rollers in friction-bearings, as illustrated in Fig. 4, in order to produce a gradually-increasing action of the brake. In the last-mentioned construction, when the arms or levers are brought together, the eccentrics first draw the friction-rollers at the back of the jaw against the axle, and then as the force or pressure becomes greater than that of the springs behind the rollers they press in the rollers and bring up the back of the jaw against the axle, thereby changing the rolling contact to a rubbing-contact and producing greater friction on the axle.

To draw the arms of the brake together, I mount an electro-magnet G in an open circuit upon one arm and fix an armature H on the other arm in front of the poles of the magnet, the parts being suitably insulated from the arms and surrounding metal parts. The wires X Y from the magnet are connected to the poles of a battery or generator, and a circuit-closer Z, located in one of the conductors, is conveniently arranged to be operated from the car to close the circuit and set the brake.

In applying the invention to a car-axle, as illustrated in Figs. 1 and 2, the jaw or part that surrounds the axle is suspended by a chain or other means and the lower arm is supported at the outer end by a bracket-piece L, bolted to the truck-frame. The corresponding end of the upper arm has suitable play in the same piece, and a spring I is placed between the two arms to throw them apart and take off the brake when the circuit is broken. If the upper arm be supported and the upper lever be allowed to drop by its own weight when the circuit is off, a spring to open the arms would not be required. In the operation of these parts when the two levers are drawn together by the electro-magnet the eccentric wheels come in contact with the axle and are caused to turn by frictional contact; but by virtue of their eccentricity they act to draw up the jaw closely against the axle, and they continue to turn until the point of the periphery on the largest radius in each wheel comes against the axle. At such time in their rotation, provided the force of rotation is greater than the holding force exerted on the arms by the magnet, they will separate the levers and afterward allow them to close under the attraction of the magnet. As the wheels continue to rotate, the resistance will be alternately increased and reduced until the force exerted by the revolving axle is not strong enough to separate the armature and magnet and allow the wheels to turn again beyond the point of their longest radius. When that point in the rotation is reached, the brake is exerting its greatest power on the axle, and it will remain set as long as the circuit is closed. The whole set or number of brakes applied to the axles throughout a train in this manner can be connected for simultaneous action by suitable arrangement of conducting-wires and a proper connection with a circuit-closing device located on the locomotive or on one of the cars, where it can be conveniently reached and operated.

I have not illustrated or described any particular arrangement of battery-circuit or circuit-closer, for the reason that the same can be applied for operation by a person skilled in the construction and operation of electric apparatus without further description.

Having thus fully described my invention, what I claim, and desire to secure by Letters Patent, is—

1. A power-brake for revolving shafts or axles, having a hinged jaw adapted to embrace the shaft, arms, or levers which are extensions of the parts of said jaw opposite the hinge, eccentrically-pivoted wheels or rollers in the jaw, and means applied to the arms or levers to draw them together and close the jaw against the shaft, substantially as described.

2. In combination with a jaw adapted to embrace and close around a revolving shaft or other part to be controlled, an eccentric wheel or roller pivoted in said jaw and adapted to be rotated by frictional contact with the revolving part when pressed against it and by such rotation to draw said jaw against the revolving part, substantially as described.

3. In combination with a jaw adapted to embrace and close around a revolving shaft or other part to be controlled, eccentrically-pivoted wheels or rollers adapted to be rotated by frictional contact with the revolving part when pressed against it, and frictional bearing-rollers on said jaw on the side of the revolving shaft opposite to the eccentrics, substantially as described.

4. In combination with the jaw adapted to embrace and close around a revolving shaft or other part to be controlled, the eccentrically-pivoted wheels or rollers in the jaw on one side of the revolving shaft, and friction wheels or rollers in yielding bearings in the opposite side of the jaw, substantially as described.

5. In a power-brake for controlling a revolving shaft or axle, a jaw adapted to embrace and close upon the shaft or part to be controlled, having arms or levers acting to close said jaw, and mechanism to draw and hold said arms or levers together, consisting of an electro-magnet mounted on one arm and an armature mounted on the other arm, a battery or generator, an open circuit, and a circuit-closer, substantially as described.

In testimony that I claim the foregoing I have hereunto set my hand and seal.

CLARENCE V. GREENAMYER. [L. S.]

Witnesses:
EDWARD E. OSBORN,
OTIS V. SAWYER.